(12) United States Patent
Hatcher et al.

(10) Patent No.: US 11,813,711 B1
(45) Date of Patent: Nov. 14, 2023

(54) GLASS SHEET POLISHING ASSEMBLY

(71) Applicant: Matthew J. Hatcher, Ft. Lauderdale, FL (US)

(72) Inventors: Matthew J. Hatcher, Ft. Lauderdale, FL (US); Erik Schneider, Davie, FL (US)

(73) Assignee: Matthew J Hatcher, Ft. Lauderdale, FL (US)

( * ) Notice: Subject to any disclaimer, the term of this patent is extended or adjusted under 35 U.S.C. 154(b) by 0 days.

(21) Appl. No.: 17/903,838

(22) Filed: Sep. 6, 2022

Related U.S. Application Data

(63) Continuation of application No. 15/994,620, filed on May 31, 2018, now Pat. No. 11,433,501.

(51) Int. Cl.
| | | |
|---|---|---|
| *B24B 29/02* | (2006.01) | |
| *C03C 15/02* | (2006.01) | |
| *B08B 11/02* | (2006.01) | |
| *C03C 23/00* | (2006.01) | |
| *B08B 11/04* | (2006.01) | |

(52) U.S. Cl.
CPC .............. *B24B 29/02* (2013.01); *B08B 11/02* (2013.01); *B08B 11/04* (2013.01); *C03C 15/02* (2013.01); *C03C 23/0075* (2013.01)

(58) Field of Classification Search
CPC ......... B24B 7/242; B24B 7/244; B24B 7/245; B24B 7/222; B24B 7/182; B24B 27/0015; B24B 41/047; B24B 41/053; B24B 49/14; B62D 57/024
See application file for complete search history.

(56) References Cited

U.S. PATENT DOCUMENTS

| | | | |
|---|---|---|---|
| 891,197 A | 6/1908 | Wadsworth | |
| 1,474,672 A | 11/1923 | Heuze | |
| 1,665,776 A | 4/1928 | Escole | |
| 1,955,128 A | 4/1934 | Henderson | |
| 4,833,832 A | 5/1989 | Lindsey et al. | |
| 4,882,881 A * | 11/1989 | VanKuiken, Jr. | ........ B25J 21/00 118/DIG. 7 |
| 4,920,495 A | 4/1990 | Pilkington | |
| 5,472,367 A | 12/1995 | Slocum et al. | |
| 5,791,971 A | 8/1998 | Dickinson et al. | |
| 5,964,645 A * | 10/1999 | Jemt | ....................... B24B 7/241 451/388 |
| 7,240,415 B2 | 7/2007 | Toncelli | |

(Continued)

*Primary Examiner* — Joel D Crandall
(74) *Attorney, Agent, or Firm* — MALLOY & MALLOY, PL

(57) ABSTRACT

A glass sheet polishing assembly includes a support assembly having a mounting assembly disposed thereon. The mounting assembly interconnects the glass sheet and the support assembly in an operative position during a polishing procedure. A carriage is movable relative to the support assembly in a first direction relative to the glass sheet. A polishing assembly is movable along a length of the carriage in a second transverse direction. A drive assembly is disposed and structured to define a movable driving relation with the polishing assembly and the carriage to define a continuous path of travel of the polishing assembly over a surface of the glass sheet and to successively move both the carriage and the positioning assembly relative to the support assembly in the first direction and continuously move the polishing assembly along said carriage in the second transverse direction.

11 Claims, 5 Drawing Sheets

(56) References Cited

U.S. PATENT DOCUMENTS

| | | | |
|---|---|---|---|
| 10,771,388 B2* | 9/2020 | Toncelli | B24B 27/0023 |
| 11,433,501 B1 | 9/2022 | Hatcher et al. | |
| 2002/0037681 A1* | 3/2002 | Gitis | G01B 17/08 |
| | | | 451/287 |

* cited by examiner

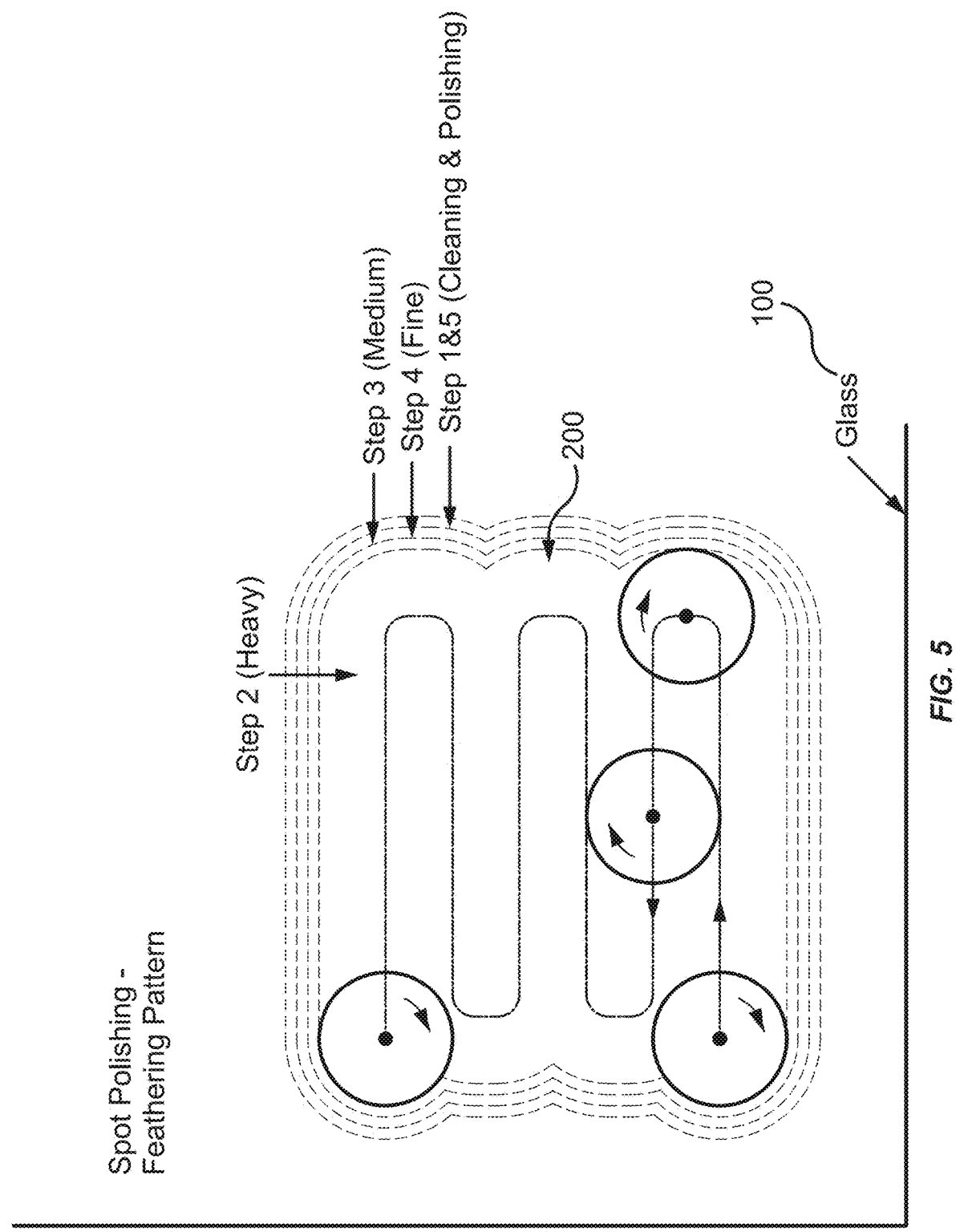

GLASS SHEET POLISHING ASSEMBLY

CLAIM OF PRIORITY

The present application is a Continuation patent application of and claims priority to a previously filed, U.S. Non-Provisional patent application, namely, that having Ser. No. 15/994,620 and a filing date of May 31, 2018, with the contents of the prior application being incorporated herein by reference in its entirety.

BACKGROUND OF THE INVENTION

Field of the Invention

This invention is directed to a glass sheet polishing assembly including a support assembly, which may be mobile, and a mounting assembly securing the glass sheet in an operative position during the polishing procedure. A drive assembly is operatively disposed to continuously move a polishing assembly over at least a majority of an exposed surface of the glass sheet, along a predetermined path of travel.

Description of the Related Art

The procedure for surfacing flat glass such as glass sheets or plates typically involves power driven surfacing tools arrange to operate on at least one surface of the glass sheet or plate. In the alternative hand operated and supported surfacing tools may be utilized. However, it is long recognized in this industry that variations in the individual surfacing tools give rise to a lack of uniformity in the surface finish when considering different areas thereof relative to one another. Also, the presence of even slight variations in the glass surface affects the degree of surfacing obtained. As a result, it is known to operate and perform the glass surface processing procedure in a way that the areas of glass which are subjected to grinding, polishing, etc. are adequately addressed.

The problem of distortion in ground and polished glass plate has been recognized as a serious problem in this industry. To the average individual not familiar with surfacing procedures for glass plates it would initially appear to be a comparatively simple matter to remove distortions or imperfections in one or both surfaces of a glass plate. In doing so, it has been known to grind and polish one surface of a glass plate or blank. Following this, the blank may be turned over and the other or opposite side of the cool glass plate is ground flat and subsequently polished. Theoretically, this should give a glass plate or sheet that is substantially flat and which has operative surfaces that are effectively parallel to one another throughout their corresponding areas.

However, in actual practice commercially ground and polished plate glass typically still may exhibit imperfections, in terms of distortions that vary from the preferred parallel orientations of opposite surfaces of the glass plate. This is particularly true in the marginal portions of the glass plate and also to some extent results in distinct curvature variations. Moreover, even curvature variations which are not noticeable to the naked eye and which may be relatively small are sufficient to give an objectionable displacement or double image affect when the processed glass plate is utilized.

In an attempt to overcome disadvantages and problems of the type set forth above more modern-day glass processing practice involves the grinding and polishing of glass by tools called grinders applied to the surface of the glass plate in a predetermined or prescribed manner. In addition, using such processing techniques, an abrasive substance is usually interposed between the surface and the grinding or polishing mechanisms. Such techniques may also involve the use of polish or a similar appropriate medium. Also, as a common practice, the polish is fed to the tools in the form of a suspension in liquid form sometimes resulting in an abrasive slurry.

Such known processes, techniques, etc. present several drawbacks to the glass processing procedure. Such drawbacks may include difficulties encountered for regularly and or uniformly feeding the medium to the grinding and polishing tools.

Therefore, there is a need in this industry for both an assembly and/or process for accurately and effectively applying a polishing/grinding action to at least one surface of a glass plate or sheet in a manner which recognizes and would overcome the processing difficulties associated with imperfections in the glass plate being processed. Such an improved and proposed system, assembly, method, etc. should take into consideration processing temperatures, and/or RPM of the polishing assemblies or devices applied to the surface during the surface processing procedures as well as the size, density, configuration etc. of the polishing or grinding pads rotationally engaging the surface being processed. In addition, such an improved processing assembly should include support and mounting structures for a glass sheet or plate which may be either fixed or mobile relative to the site or location where glass sheet processing is accomplished.

SUMMARY OF THE INVENTION

The present invention is directed to an assembly structured to polish a glass sheet or plate. As used herein, the term "polishing" is meant to include a multi-step procedure which may include, but be limited to, the cleaning, grinding and polishing of an exposed surface of a large glass sheet or plate. As such, the term polishing may include a multistage cleaning procedure followed by at least one true polishing stage.

In more specific terms, the glass polishing assembly of the present invention includes a support assembly structured to support the glass sheet during the "polishing" procedure. Further, a mounting assembly is connected to the support assembly and is disposed and structured to mount the glass sheet, in a secure fashion, on the support assembly in an "operative position".

A polishing assembly is disposed and structured to movably engage the corresponding surface of the glass sheet during the various stages of the polishing procedure. In addition, a carriage, preferably having an elongated configuration, is movably connected to the support assembly and movably positioned thereon relative to the glass sheet along a first travel path. The polishing assembly is movably connected to the carriage and is movable thereon, preferably along the length thereof, relative to the glass sheet and along a second travel path.

The first and second travel paths are oriented in transverse relation to one another and collectively define a substantially continuous path of travel of the polishing assembly relative to the surface of the glass sheet being processed. Moreover, the continuous path of travel of the polishing assembly may also be accurately described as a continuous indexing of the polishing assembly along the continuous path of travel and more specifically along the first and second travel paths which, as set forth above, are oriented in transverse relation to one another. As also described in greater detail hereinafter, the processing of substantially the entire exposed surface of the glass sheet is accomplished in an at least partially automated fashion as the polishing assembly travels, in an indexing manner, along the continuous path of travel.

However, in at least partial contrast, the polishing assembly may move or travel in a "feathering pattern" in order to clean, grind, polish, etc. a specific, predetermined area or zone of the glass sheet, rather than over an entirety or majority of the exposed surface thereof. Accordingly, the "feathering pattern" refers to a "spot" polishing of the aforementioned predetermined area or zone. As should be apparent from a more detailed description hereinafter provided, a controlled movement or travel of the polishing assembly during the "feathering pattern" is accomplished using the same structural and operative features associated with the polishing assembly as it moves along the aforementioned continuous path of travel.

In order to operate the polishing assembly in the at least partially automated manner while traveling along at least the continuous path of travel, each of the preferred embodiments of the present invention include a drive assembly. The drive assembly is concurrently disposed in movable driving relation with the polishing assembly and the carriage, as indicated above. In addition, the drive assembly is operatively structured to further define the continuous path of travel of the polishing assembly, relative to the carriage, at least over a majority of the exposed surface of the glass sheet being processed, concurrent to the glass sheet being maintained in the operative position by the support assembly.

Moreover, the drive assembly comprises at least a first drive assembly disposed and structured to concurrently move the carriage and the polishing assembly relative to the support assembly, successively in an indexing fashion along the first travel path. In cooperation therewith, the drive assembly also includes a second drive assembly disposed and structured to continuously move the polishing assembly along the length of the carriage as it traverses the second path of travel. In one or more preferred embodiments, each of the first and second drive assemblies may be defined by a drive motor and additional operative components associated there with.

In more specific terms, the first travel path comprises the preferably elongated carriage, as well as the polishing assembly mounted thereon, being successively indexed in one direction, such as a long a width or length of the glass sheet. In cooperation therewith, the aforementioned second travel path comprises the movement of the polishing assembly along the length of the carriage subsequent to each indexed movement of the carriage along the aforementioned first travel path. Moreover, the second travel path is also defined and described as movement of the polishing assembly in opposite directions along the length of the carriage after successive indexed movement and positioning of the carriage. As also noted, the opposite directional movement of the polishing assembly along the length of the carriage is in a direction which is transverse to the movement of the carriage along the glass sheet.

Further by way of non-limiting example the carriage, with the polishing assembly mounted thereon, may move along the length or longitudinal dimension of the glass sheet in successive increments. Subsequent to each indexed movement of the carriage, the polishing assembly will travel along the length of the carriage and along the width of the glass sheet, transverse to the length thereof. As also indicated, the movement of the polishing assembly along the length of the carriage will occur in an opposite direction after each indexed or incremental movement of the carriage.

The at least partially automated polishing procedure of the present invention is facilitated by the structural and operative details of the polishing assembly. Accordingly, the polishing assembly includes the aforementioned second drive assembly or drive second motor facilitating driven travel of the polishing assembly along the length of the carriage. In addition, the drive assembly of the present invention also includes a third drive assembly or third drive motor which rotationally drives a spindle, polishing head and pad secured to the polishing head. The pad may be impregnated with a cleaning or polishing compound, as will also be explained.

Additional structural and operative features of the support assembly include at least one preferred embodiment having a mobile construction. As such, the support assembly preferably in the form of a base and or housing frame connected to and supporting the mounting assembly, carriage and polishing assembly. Further, the mobile construction of the support assembly may include a plurality of rollers, wheels or like mobile structures movable over a supporting surface, while being structured to support a remainder of the glass polishing assembly. As a result, the support assembly which incorporates the mobile construction, adds an enhanced versatility of the glass polishing assembly, allowing it to be positioned relative to glass sheets or plates which may be permanently installed, mounted or otherwise positioned.

In contrast, yet another embodiment of the support assembly may have a substantially fixed construction wherein the operation thereof is intended to be maintained in a single work location rather than being selectively moved to various locations in which the glass sheets are installed or otherwise fixedly positioned.

Moreover, the mounting assembly associated with one or more preferred embodiments of the support assembly may include a plurality of suction devices adjustably disposed on the corresponding support assembly so as to be secured to the glass sheet being processed in a secure reliable and stable manner. This embodiment of the mounting assembly also enhances the versatility specifically, but not exclusively, of the support assembly incorporated in the mobile construction. As such, the mobile support assembly may be positioned in operative relation to an installed or fixedly disposed glass sheet. When the support assembly is so disposed, the plurality of suction devices may be arranged to securely engage and connect the glass sheet to the polishing assembly and maintain the polishing assembly in the aforementioned operative position, relative to the glass sheet being processed. As such, when the glass sheet being processed is permanently or fixedly installed in an intended location, the plurality of suction devices serve to effectively support, connect, mount, etc. a remainder of the support assembly, polishing assembly, etc. on or relative to the glass sheet. Accordingly, the "operative position" may be further defined by such a supporting, interconnecting relation of the polishing assembly relative to the fixed or installed glass sheet.

However, the mounting assembly may also be in the form of a fixed, mounting frame which may be better adapted for use with the fixed support assembly. As such, the mounting frame may be dimensioned and configured to have a lattice-type configuration including the various components thereof disposed in supporting relation to the glass sheet. As such the glass sheet will be maintained in the aforementioned operative position.

Yet additional structural and operative features of one or more preferred embodiments of the glass polishing assembly of the present invention includes the provision of a control assembly. The control assembly may comprise a microcontroller operatively associated with plurality of sensors. The plurality of sensors are collectively disposed and structured to regulate operational characteristics of at least the polishing assembly. Such operating characteristics may include, but not be limited to; RPM of the polishing head of the polishing assembly; pressure of the polishing head on the exposed surface of the glass sheet and rate of travel of the polishing assembly along the second travel path or length of the carriage.

Moreover, such operating characteristics may also include a temperature of the surface of the glass sheet being processed. The plurality of sensors operative to determine and regulate the aforementioned operative characteristics may also be cooperatively associated with one or more limit switches. The limit switches, in cooperation with the sensors and/or independently thereof serve to efficiently control the polishing assembly as it moves along both the continuous path of travel and the aforementioned feathering pattern, the latter during spot polishing of predetermined zones the glass sheet.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 5 is a schematic representation of a path of travel and/or indexing of a polishing assembly, of the embodiments of FIGS. 1-3, over a predetermined portion of an exposed surface of a glass sheet, during a "spot" polishing procedure.

Like reference numerals refer to like parts throughout the several views of the drawings.

DETAILED DESCRIPTION OF THE PREFERRED EMBODIMENT

As represented in the accompanying Figures, the present invention is directed to a glass polishing assembly generally indicated as 10 and 10' for the processing, including the cleaning, grinding, polishing, etc. of comparatively large glass plates or sheets. The embodiment of FIG. 1 is distinguishable from that of the embodiment of FIG. 2 by virtue of an integrated, incorporated mobile construction.

Figure 1:
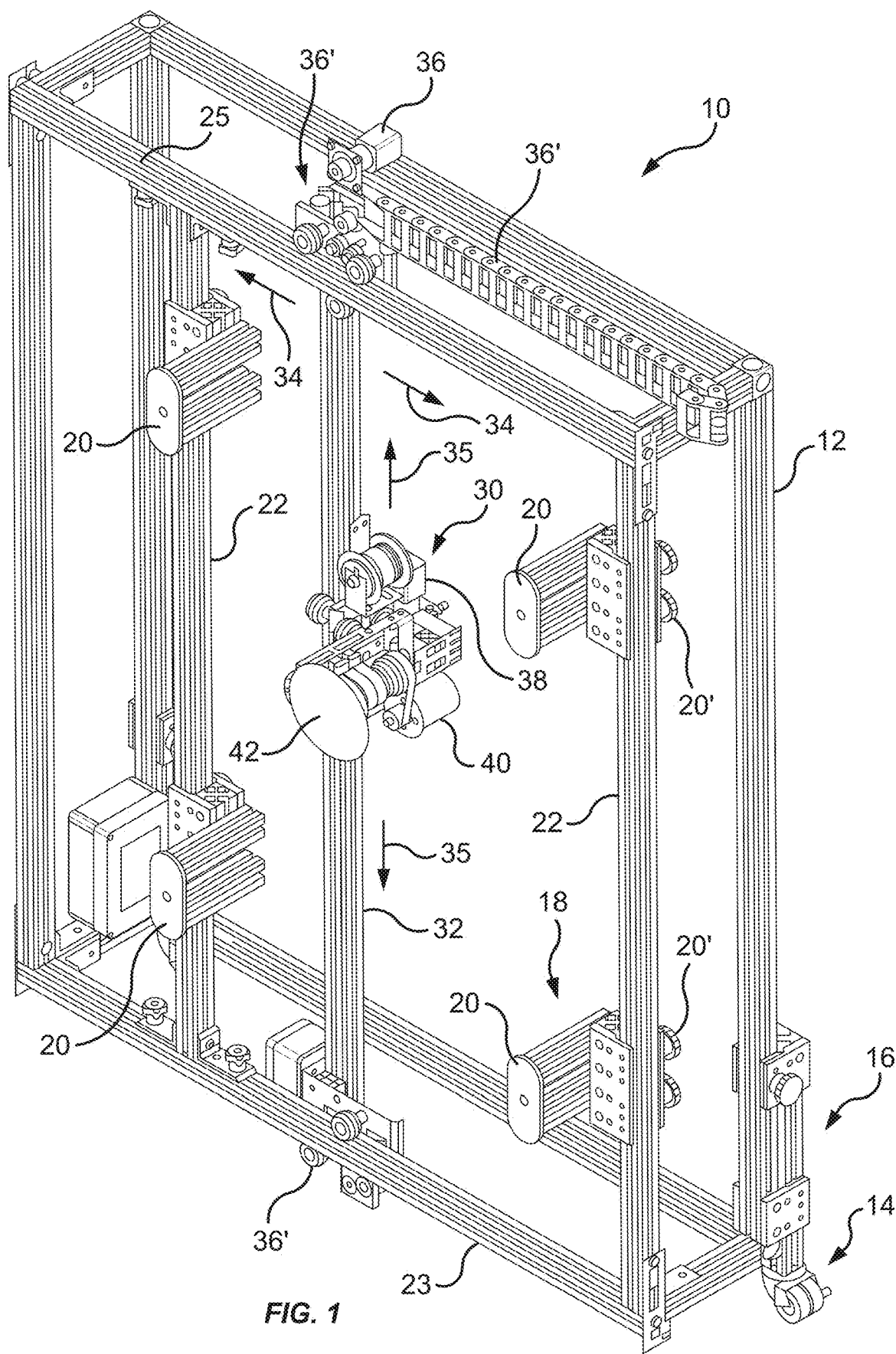
FIG. 1 is a perspective view of one preferred embodiment of the glass polishing assembly of the present invention.

In more specific terms and with primary reference to the polishing assembly 10 of the embodiment of FIG. 1, a support assembly generally indicated as 12 includes a base or housing frame composed of a number of interconnected beam sections, as represented. The aforementioned mobile construction is at least partially defined by one or more sets of rollers, wheels, etc. generally indicated as 14. In addition, each of the one or more sets of rollers, wheels, etc. 14 includes an adjustment structure generally indicated as 16 which allows the height or vertical positioning of the support assembly 12 relative to the supporting surface on which the rollers 14 are disposed. Accordingly, the support assembly 12 may be selectively disposed in operative communication with a glass sheet 100 or plate which is permanently and/or fixedly installed or otherwise positioned. Enhanced versatility is thereby provided the glass assembly 10 of the embodiment of FIG. 1.

The glass polishing assembly 10 also includes a mounting assembly, generally indicated as 18 including a plurality of suction devices 20 connected to correspondingly disposed beam sections 22 of the base frame of the support assembly 12. Each of the corresponding beam sections 22 may be adjustable along support beams 23 and 25. In addition, the disposition and spacing of the plurality of suction devices 20 relative to one another, along corresponding beam sections 22, may also be selectively established by virtue of corresponding adjustment facilities 20'. Such adjustment capabilities serve to selectively dispose the plurality of suction devices 20 in an appropriate interconnected engagement with a glass sheet 100 being processed. In turn, an operative position is established between the glass sheet 100 and the polishing assembly 10. Due to the fact that the glass sheet 100, may be fixedly installed or otherwise permanently located, the "operative position" is meant to include the positioning of the remainder of the polishing assembly 10 relative to a fixed or permanently installed glass sheet, rather than a supporting of the glass sheet on the polishing assembly 10.

Therefore, as should be apparent, the versatility of the glass polishing assembly 10 is thereby significantly enhanced due to the ability of the plurality of suction devices 20 to engage and be connected to a glass sheet 100 at different portions thereon. Therefore, the mounting assembly 18, enables the glass polishing assembly 10 to process glass sheets or plates of different sizes, wherein the glass sheets may be located or fixedly installed in different locations, positions, etc.

Each of the preferred embodiments of the glass polishing assembly 10 and 10' also include a polishing assembly generally indicated as 30. Structural and operative features of the polishing assembly 30 will be described in greater detail hereinafter with primary reference to FIG. 3A-3B. The polishing assembly 30 is mounted on a carriage 32 preferably having an elongated configuration, as represented. As also explained in greater detail hereinafter, the carriage 32 is movable along a first travel path, schematically represented by directional arrows 34 along one dimension of the glass sheet 100 when connected to the support assembly 12 by the mounting assembly 18 in the aforementioned operative position. In cooperation therewith, the polishing assembly 30 is movable along the length of the carriage 32 in a second travel path schematically represented by directional arrows 35.

Figure 4:
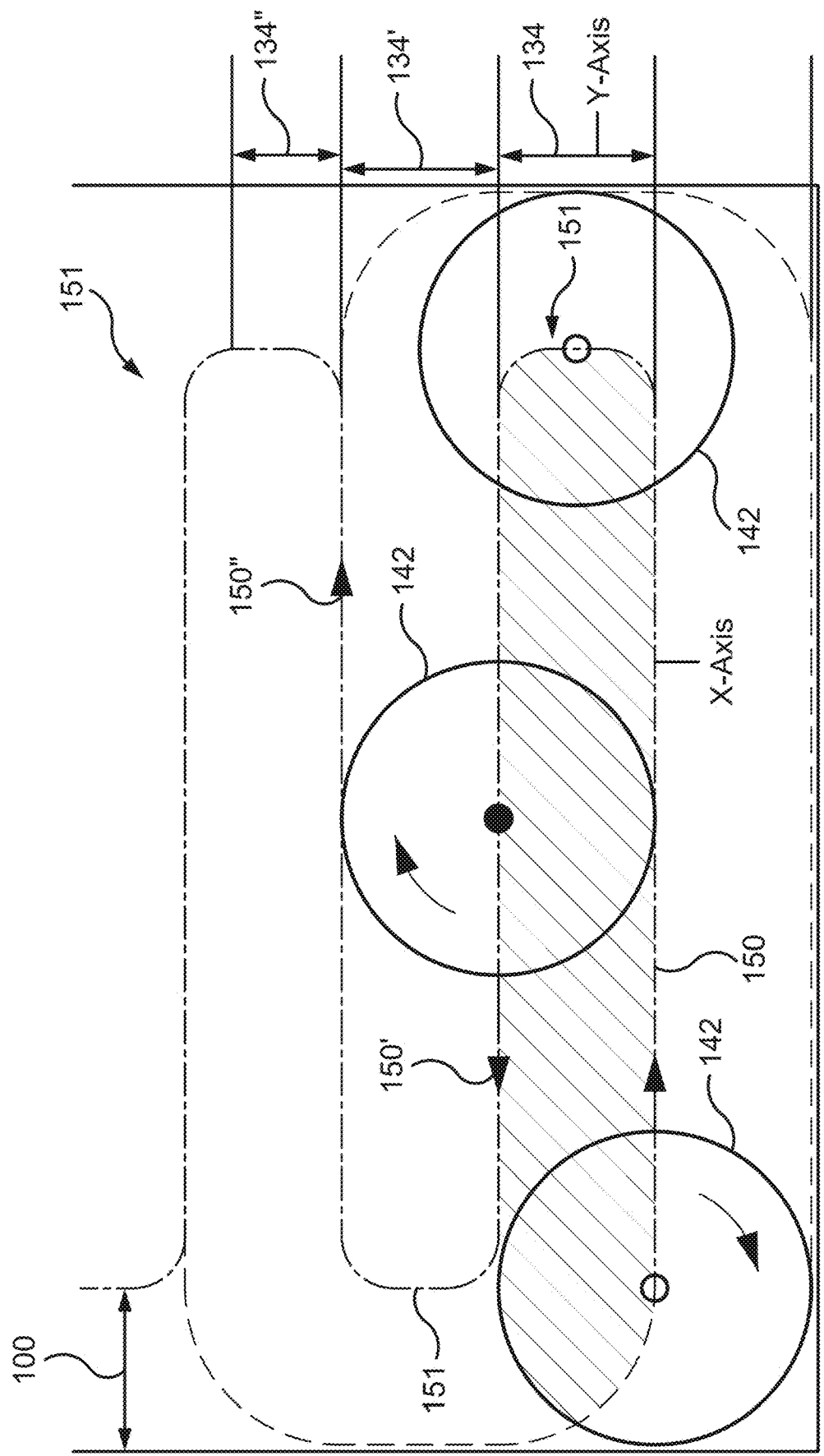
FIG. 4 is a schematic representation of a continuous path of travel and/or indexing of a polishing assembly, of the embodiments of FIGS. 1-3 over an exposed surface of a glass sheet during a polishing procedure.

As clearly noted, the carriage 32 is movable along the length of the support assembly 12 and the first travel path 34 in a first direction, which is transverse to the direction of travel of the polishing assembly 30 along the length of the carriage 32 and second travel path 35. Therefore, an entirety or at least a majority of the surface being processed will be covered by the polishing assembly 30, wherein the first and second travel paths 34 and 35 collectively define a continuous path of travel of the polishing assembly over the surface of the glass sheet 100 being processed. Specific segments of the continuous path of travel are schematically represented in FIG. 4, to be described in greater detail hereinafter.

In order to accomplish intended, predetermined and at least partially automated travel of the polishing assembly 30 along the continuous path of travel and in cooperation with the movement of the carriage 32, the glass polishing assembly 10 and 10' both include a drive assembly. The drive assembly includes a first drive assembly and or first drive motor 36 operatively associated with a plurality of drive components generally indicated as 36'. The first drive assembly 36 is disposed and structured to facilitate movement of the carriage 32 along the first travel path 34 in the direction schematically indicated. In addition, the drive assembly also includes at least a second drive assembly generally indicated as 38 associated with a plurality of correspondingly disposed drive components. The second drive assembly 38 is disposed and structured to move the polishing assembly 30 along the length of the carriage 32 in accord with the second travel path 35. The drive assembly also includes at least a third drive assembly and or drive motor 40 serving to rotationally operate a spindle 41 of the polishing head 42 of the polishing assembly 30 as the polishing head/polishing pad rotationally engage the surface of the glass sheet 100 or plate being processed.

Figure 2:
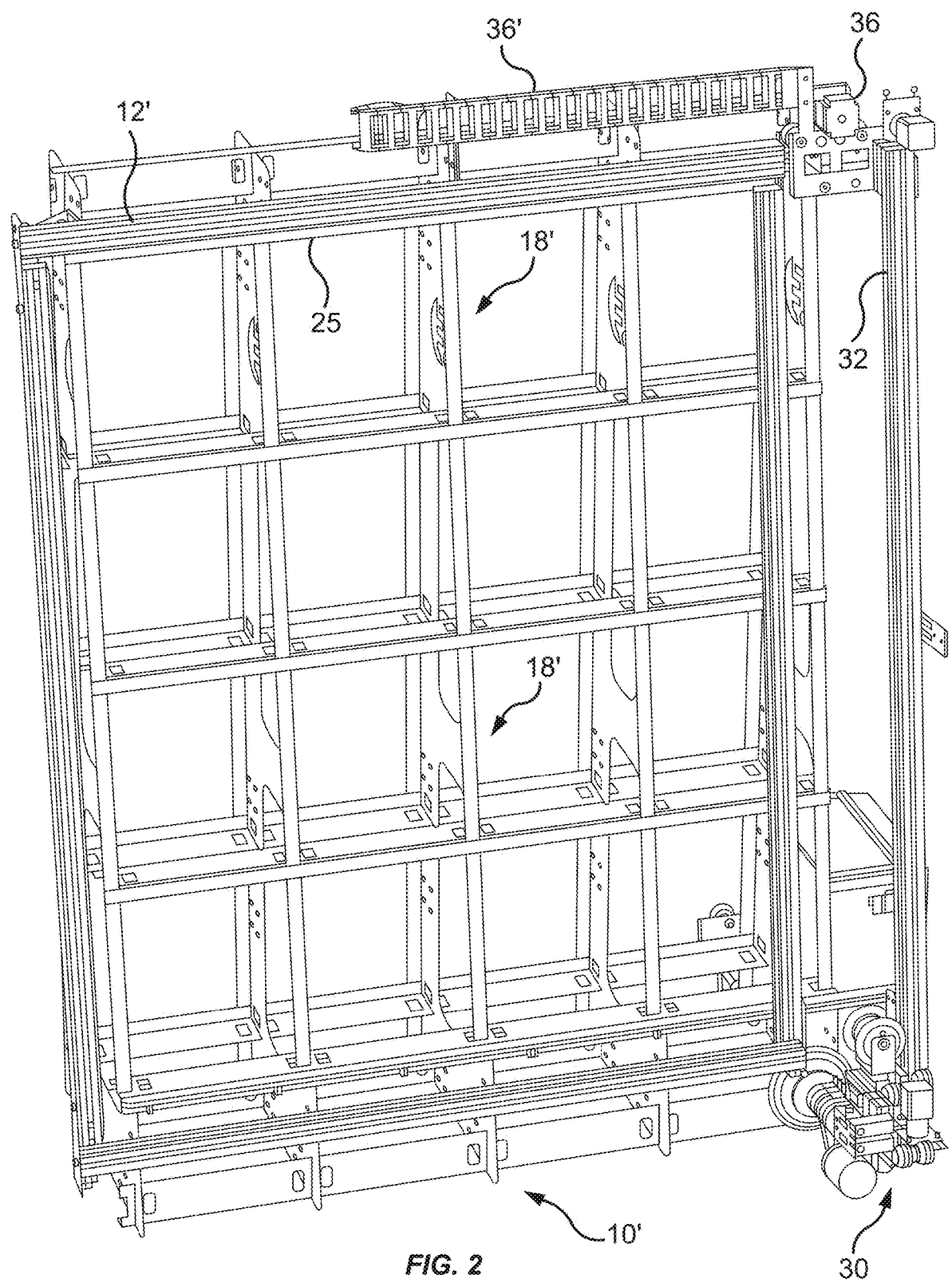
FIG. 2 is a perspective view of yet another embodiment of the present invention operatively similar but structurally distinguishable from the embodiment of FIG. 1.

With primary reference to FIG. 2, the embodiment of the glass polishing assembly 10' is operationally equivalent, in most aspects, to that of the glass polishing assembly 10 of the embodiment of FIG. 1. However, distinguishing structural features include the support assembly 12' being substantially fixed, in the sense that it is located in a permanent or semi-permanent work area and is operable on glass sheets or plates which are brought to and secured on the glass polishing assembly 10'. Also, the mounting assembly 18' is generally in the form of a mounting frame disposed and structured to engage an undersurface of the glass sheet 100 or plate being processed. The mounting frame 18' may have a lattice-type configuration which is dimensioned to extend over at least a majority and/or an entirety of the undersurface of the glass sheet 100. As such the glass sheet 100 being processed is disposed, supported and maintained in a predetermined or preferred operative position. The "operative position" of the glass sheet 100, whether used in association with the glass polishing assembly 10 or 10' may be at least generally defined by a cooperative, relative disposition of polishing assembly 30 and the glass sheet 100, so as to efficiently enable the polishing assembly 10, 10' to perform the intended polishing procedures on at least one exposed surface of the glass sheet 100.

Other features of the glass polishing assembly 10' may be substantially equivalent to that of the glass polishing assembly 10, including a polishing assembly 30 structured to move along the length of the carriage 32. Further, the carriage 32 is structured to move along the length of a supporting, corresponding beam section 25 of the support assembly 12'. Moreover, the glass polishing assembly 10' also includes the aforementioned first drive assembly 36, second drive assembly 38 and third drive assembly 40, the latter operatively associated with the polishing assembly 30. Similarly, the first, second and third drive assemblies may each be in the form of drive motors operatively equivalent to the drive assembly, as described with reference to the embodiment of FIG. 1.

As set forth above, the aforementioned "continuous path of travel" of the polishing assembly 30 is at least partially defined by the first travel path 34 and the second travel path 35. With reference to FIG. 4, the direction of rotation of the pad 42 of the polishing assembly 30 is schematically represented as 142. In cooperation therewith the indexed, incremental, successive movement of the carriage 32, with the polishing assembly 30 mounted thereon, is schematically represented as at 134, 134', 134", etc. along the aforementioned first travel path 34, as set forth in the description of FIG. 1. In more specific terms, the carriage 32 and polishing assembly 30 will concurrently move in successive, incremental "steps" 134, 134' and 134" along one direction (Y-axis) of the glass sheet 100 being processed. Such indexed, incremental steps are schematically represented as 134, 134' and 134", etc. After each incremental step has been accomplished, the carriage 32 will stop for a predetermined length of time sufficient to allow the polishing assembly to travel in opposite directions as at 150, 150' and 150", etc. along the length of the carriage 32. As previously indicated, the successive, incremental, indexed movement 134, 134' and 134" occurs in a direction which is transverse to the continuous, movement 150, 150' and 150" of the polishing assembly 30 (X-axis) as it continues to rotate 142, in engagement with the glass sheet 100 being processed.

Figure 3:
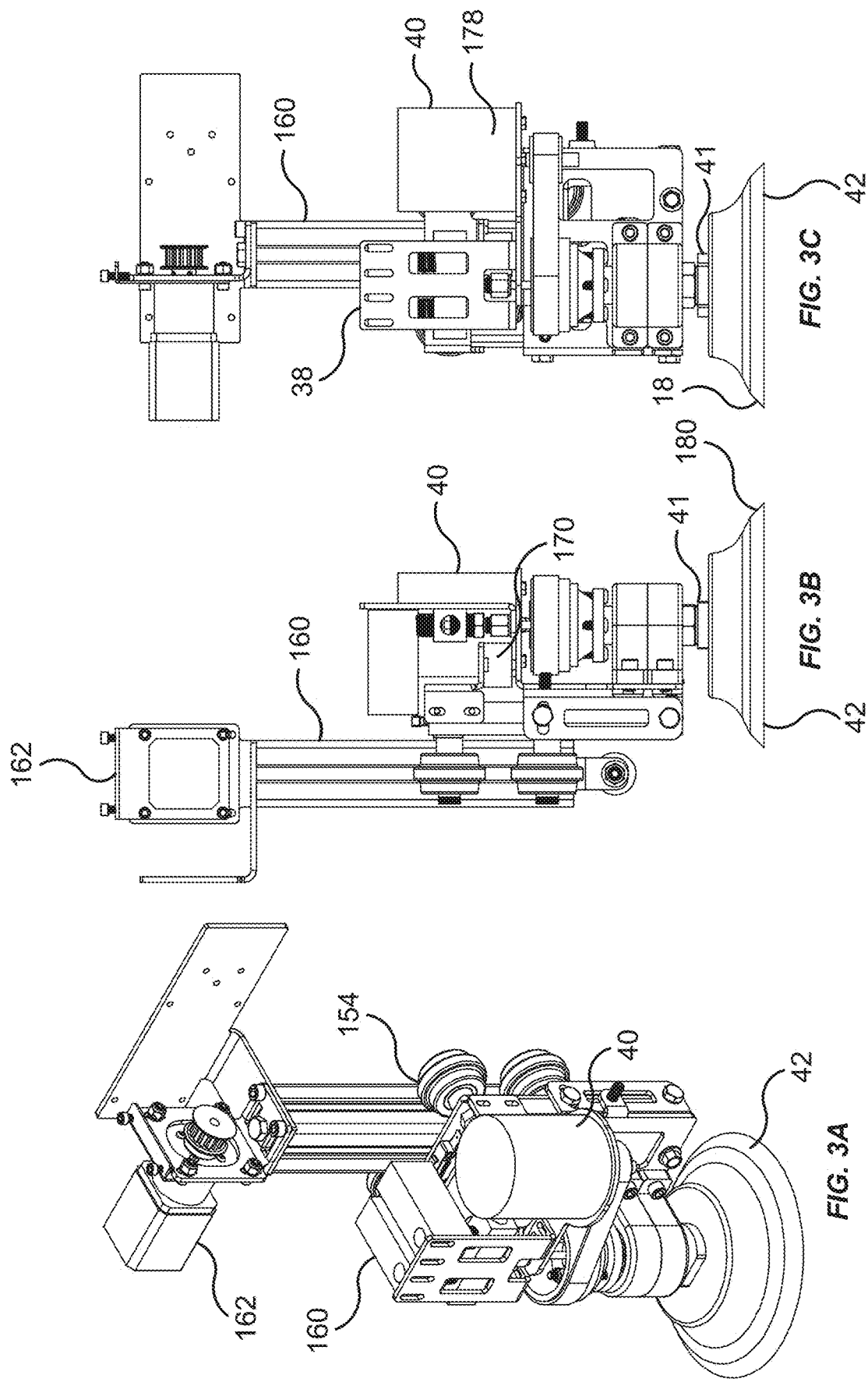
FIG. 3A is a perspective view of the polishing assembly of the embodiment of FIGS. 1-2.
FIG. 3B is a front view of the polishing assembly of the embodiment of FIG. 3A.
FIG. 3C is a side view of the polishing assembly of the embodiment of FIGS. 3A-3B.

Yet another feature associated with the drive assembly is represented in FIGS. 3A-3C and includes a lift assembly generally indicated as 160. More specifically, when the polishing assembly 30 reaches the end 151 of its reciprocal travel 150, 150' 150" it will raise or lift up, at least a minimal amount, to clear the pad 42 from rotational engagement with the surface of the glass sheet 100 being processed. During this raised or lifted orientation, the pad 42 will continue to rotate thereby automatically serving to clean itself of powder/polish and other debris collected during a previous pass 150, 150', 150" etc. during the polishing procedure. The amount or degree of "lift" may be minimal and need only be sufficient to remove the rotating pad 42 from engagement with the surface of the glass sheet 100 being processed. Again, with reference to FIG. 3A, a limit switch, as at 154, may be part of a control assembly and be directly associated with the lift mechanism or assembly 160. The limit switch, in cooperation with the lift assembly 160, serves to determine and regulate the lifting of the pad 42 off the glass sheet 100, in what may be accurately described as lifting movement of the pad 42 along a "Z-axis". The "Z-axis" is meant to distinguish the direction of the lifting movement of the polishing assembly 30 relative to the X-axis and Y-axis schematically referring to and representing respective travel of the carriage 32 along the length of the support assembly 12 and/or 12' and relative to the travel of the polishing assembly 30 along the length of the carriage 32.

Further by way of example, the first travel path 34 comprises the preferably elongated carriage 32, as well as the polishing assembly 30 mounted thereon, being successively and incrementally indexed, as at 134, 134' and 134", in one direction, such as a long a width or length of the glass sheet 100. In cooperation therewith, the aforementioned second travel path 35 comprises a substantially continuous movement of the polishing assembly 30 along the length of the carriage 32, as at 150, 150' and 150", subsequent to each indexed movement of the carriage 32 along the aforementioned first travel path 34. Moreover, the second travel path 35 is also defined and described as movement of the polishing assembly in opposite directions, as clearly represented in FIG. 4, along the length of the carriage 32 after successive indexed movements 134, 134' in 134" of the carriage 32. As also noted in FIGS. 1 and 4, the opposite directional movement of the polishing assembly along the length of the carriage 32 is in a direction which is transverse to the movement of the carriage 32 along the glass sheet 100 being processed.

Yet additional structural and operative features of one or more preferred embodiments of the glass polishing assembly 10 and 10' of the present invention includes the provision of a control assembly. The control assembly may comprise a microcontroller operatively associated with plurality of sensors. The plurality of sensors are collectively disposed and structured to regulate operational characteristics of at least the polishing assembly 30. Such operating characteristics may include, but not be limited to; RPM of the polishing head 42 of the polishing assembly 30; pressure of the polishing head 42 on the exposed surface of the glass sheet 100 and rate of travel of the polishing assembly 30 along the second travel path or length of the carriage 32.

With primary reference to FIG. 3A-3C, the aforementioned control assembly and/or microcontroller are operative with and at least partially defined by the aforementioned plurality of sensors. The plurality of sensors may include a force or pressure sensor 170 directly associated with the second drive motor 40 and or lift assembly 160, thereby being determinative of the pressure or force the polishing head 42 exerts on the surface of the glass sheet 100 being processed. In addition, one or more of the aforementioned plurality of sensors may be directly associated with RPM of the rotational, spindle motor 40 and may be in the form of one or more Hall effect sensors as at 178.

Moreover, such operating characteristics may also include a temperature of the surface of the glass sheet 100 being processed. As such, one or more temperature sensors may be directly incorporated in the pad 42, as at 180, of the polishing assembly 30. As indicated, the plurality of sensors may be operative to determine and regulate the aforementioned operative characteristics and may also be cooperatively associated with one or more limit switches. The limit switches may include one or more limit switches such as, but not limited to, the limit switch 154 associated with raised or lifted movement of the polishing head 42 in the "Z-axis", as set forth above. The limit switches, as at 154, in cooperation with the sensors and/or independently thereof serve to efficiently control the polishing assembly 30 as it moves along both the continuous path of travel and the aforementioned feathering pattern, the latter during spot polishing of predetermined zones the glass sheet 100.

As represented in FIG. 5, the glass polishing assembly 10, 10' is capable of "spot polishing" and in doing so the polishing assembly 10, 10' may be automatically regulated to pass through a "feathering pattern". As such the various steps 1-5 are schematically represented in performing a localized or "spot polishing" in a designated zone 200. The designated zone 200, by way of example only, may be defined by the lower left location of the glass sheet 100 and/or the upper right location of the glass sheet 100 and other locations thereon, as needed. Such zones or locations are determined and established by the operator setting movement of the machine/polishing assembly 30 and setting the intended or predetermined zone points.

As also represented in FIG. 5, the carriage 32 and polishing assembly 30 will move over the zone 200 in the same continuous indexing pattern including the substantially continuous path of travel over the zone 200 as represented in FIG. 4. More specifically and as described in FIG. 4, the carriage 32 will move in successive, incremental "steps" 134, 134' and 134" along one direction (Y-axis) of the zone 200 of the glass sheet 100. Moreover, after each incremental step of the carriage 32 has been accomplished, the carriage 32 will stop for a predetermined length of time sufficient to allow the polishing assembly 30 to travel in opposite directions as at 150, 150' and 150", etc. along the length of the carriage 32, in the direction of the X-axis.

In addition, the above noted continuous path of travel will be performed in a multi-step process, as schematically represented in FIG. 5. In step 1 and step 5, a cleaning cycle of the zone 200 is accomplished. Step 2 defines a "heavy step" including an inward movement of generally about 1.5 inches of the polishing assembly 30, where a "heavy step" procedure is performed. Subsequently, the polishing assembly moves ½ inch outward to perform a "medium step" defining a step 3. A "fine step" procedure defines step 4, wherein the polishing assembly 30 moves ½ inch outward from step 3.

Further by way of non-limiting example, the cleaning procedure may be accomplished using a felt pad with appropriate compound impregnated therein. During such cleaning step or stages the RPM may vary between 1100 to 1500, with a preferred RPM of 1300; the pressure applied by the pad 42 to the glass sheet 100 may range from 8 to 12 pounds, with a preferred pressure of 10 pounds; a feed rate of the polishing assembly along the carriage may range from 250 to 300 ft./min, with a preferred rate of 275 feet per minute. Further temperature changes may be from +20 to +30° F. with a preferred temperature change of +25° F. The above may be accomplished during the "heavy stage" as set forth above.

The operative characteristics during the "medium stage" may involve a RPM between 900 and 1300, with a preferred RPM of 1100; a pressure of 20 to 30 pounds, with a preferred pressure of 25 pounds; a feed rate of 40 to 60 ft./min with a preferred feed rate of 50 ft./min and a temperature range of +20 to +50° F., with a preferred temperature range of +30° F. During the "fine stage" procedure, as set forth above the RPM may vary between 900 to 1300, with a preferred RPM of 1000; a pressure range of between 20-40 pounds, with a preferred pressure of 25 pounds; a feed rate of 42 60 ft./min with a preferred feed rate of 50 ft./min and a preferred temperature range of +20 to +55° F., with a preferred temperature of +35° F. Distinguishing features between the heavy, medium and fine stages of cleaning may include and 80 grit, 180 grit and 500 grit respectively of the pad associated with the polishing head 42.

Thereafter the aforementioned polishing stage may be accomplished with the felt pad with appropriate polishing compound wherein the operating characteristics include an RPM of 600 to 1000, with a preferred RPM of 800; a pressure of 10 to 20 pounds, with a preferred pressure of 15 pounds; a feed rate of 40 to 60 ft./min, with a preferred the rate of 50 ft./min and a preferred temperature range of +20 to +75° F. plus a preferred temperature range of +40° F.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

The invention claimed is:

1. An assembly structured to polish a glass sheet, said assembly comprising:

a support assembly, said support assembly being movable relative to an underlying supporting surface so as to accommodate variable positioning of the glass sheet;

a mounting assembly connected to said support assembly and structured to connect the glass sheet and said support assembly in an operative position, a polishing assembly disposed and structured to movably engage the glass sheet when in said operative position, a carriage movably connected to said support assembly; said polishing assembly movably mounted on said carriage, a drive assembly comprising a first drive motor and a second drive motor, said first drive motor disposed and structured to concurrently move said carriage and said polishing assembly relative to said support assembly in incremental, successive steps, along said first travel path;

said second drive motor disposed and structured to reciprocally move said polishing assembly relative to said carriage, along said second travel path;

said first and second drive motors concurrently operative to define a continuous indexing of said polishing assembly along a substantially continuous path of travel over and in engagement with at least a majority of the glass sheet, a control assembly including a plurality of sensors, said plurality of sensors collectively disposed and structured to regulate operational characteristics of at least said polishing assembly, and said operating characteristics comprising at least one of: RPM of said polishing assembly; pressure of said polishing assembly on the glass sheet; rate of travel of said polishing assembly along said carriage.

2. The assembly as recited in claim 1 further comprising a third drive motor disposed and structured to position said polishing assembly into rotational engagement with the glass sheet.

3. The assembly as recited in claim 2 further comprising a cooperative disposition of at least said second and third drive motors to define said movement of said polishing assembly along said second travel path concurrent to said rotational engagement of said polishing assembly with the glass sheet.

4. The assembly as recited in claim 1 wherein said mounting assembly comprises a mounting frame dimensioned and configured to supportingly engage an undersurface of the glass sheet when in said operative position.

5. The assembly as recited in claim 4 wherein said mounting assembly comprises a plurality of suction devices disposed on said support assembly in spaced relation to one another.

6. The assembly as recited in claim 5 wherein said plurality of suction devices are collectively disposed in removable engagement with the glass sheet when in said operative position.

7. The assembly as recited in claim 1 wherein said mounting assembly comprises a plurality of suction devices disposed on said support assembly in spaced relation to one another; said plurality of suction devices collectively disposed in removable engagement with the glass sheet when in said operative position.

8. The assembly as recited in claim 1 wherein said operating characteristics further comprise temperature of the glass sheet during a polishing procedure.

9. The assembly as recited in claim 1 wherein at least two of said plurality of sensors are mounted on said polishing assembly in operative connection with said second drive motor.

10. The assembly as recited in claim 1 further comprising a limit switch assembly operative to regulate movement of said polishing assembly along said carriage.

11. An assembly structured to polish a glass sheet, said assembly comprising:
    a support assembly,
    a mounting assembly connected to said support assembly and structured to connect the glass sheet and said support assembly in an operative position,
    a polishing assembly disposed and structured to movably engage the glass sheet when in said operative position,
    a carriage movably connected to said support assembly; said polishing assembly movably mounted on said carriage,
    a drive assembly comprising a first drive motor and a second drive motor, said first drive motor disposed and structured to concurrently move said carriage and said polishing assembly relative to said support assembly in incremental, successive steps, along said first travel path;
    said second drive motor disposed and structured to reciprocally move said polishing assembly relative to said carriage, along said second travel path;
    said first and second drive motors concurrently operative to define a continuous indexing of said polishing assembly over and in engagement with the glass sheet;
    a control assembly including a plurality of sensors, said plurality of sensors collectively disposed and structured to regulate operational characteristics of at least said polishing assembly; and
    said operating characteristics comprising at least one of: RPM of said polishing assembly; pressure of said polishing assembly on the glass sheet; rate of travel of said polishing assembly along said carriage.

* * * * *